Oct. 13, 1959  M. J. BAMBER  2,908,164
BEARINGS WITH FORCE INDICATING MEANS
Filed Jan. 31, 1957  2 Sheets-Sheet 1
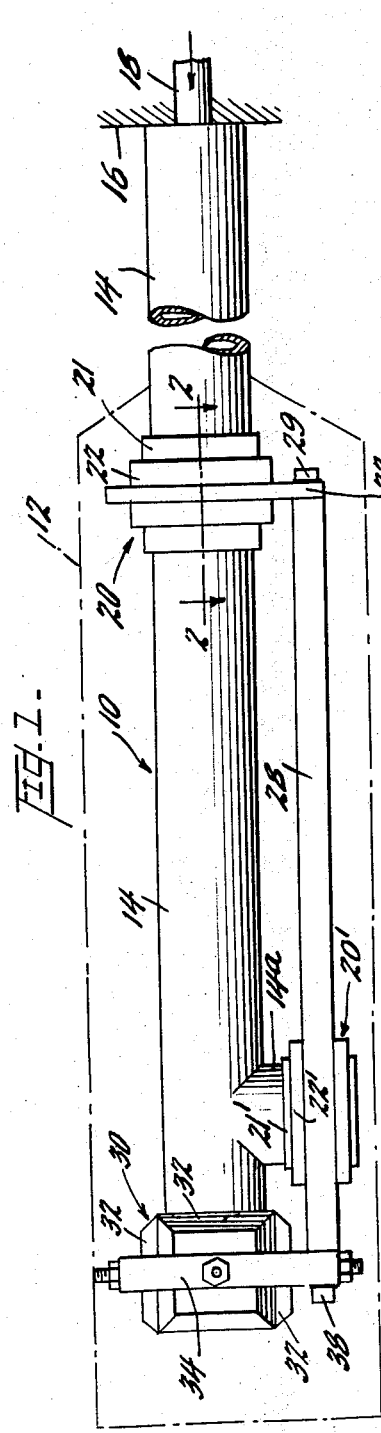
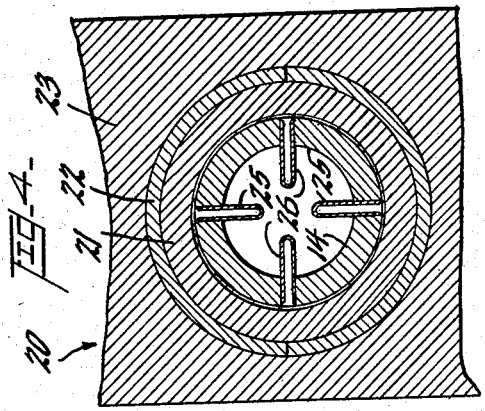
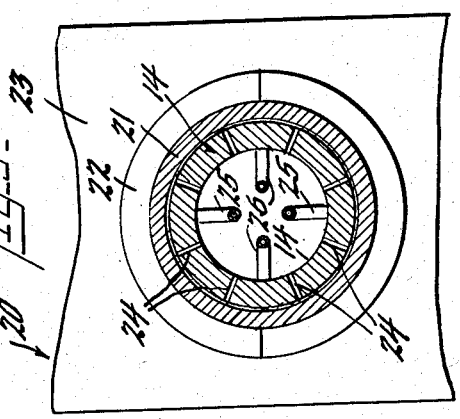
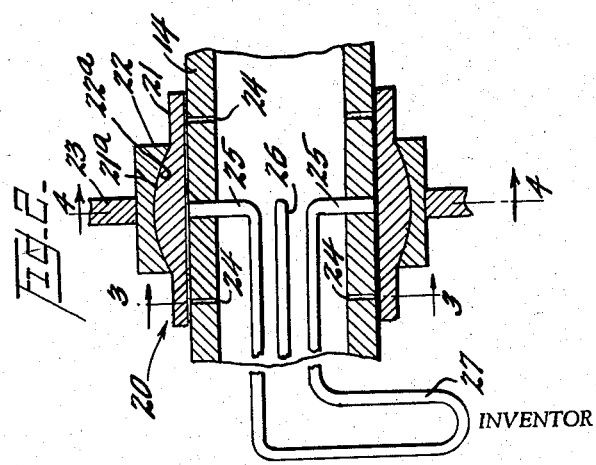
INVENTOR
Millard J. Bamber;
BY
B. L. Zangwill
ATTORNEYS

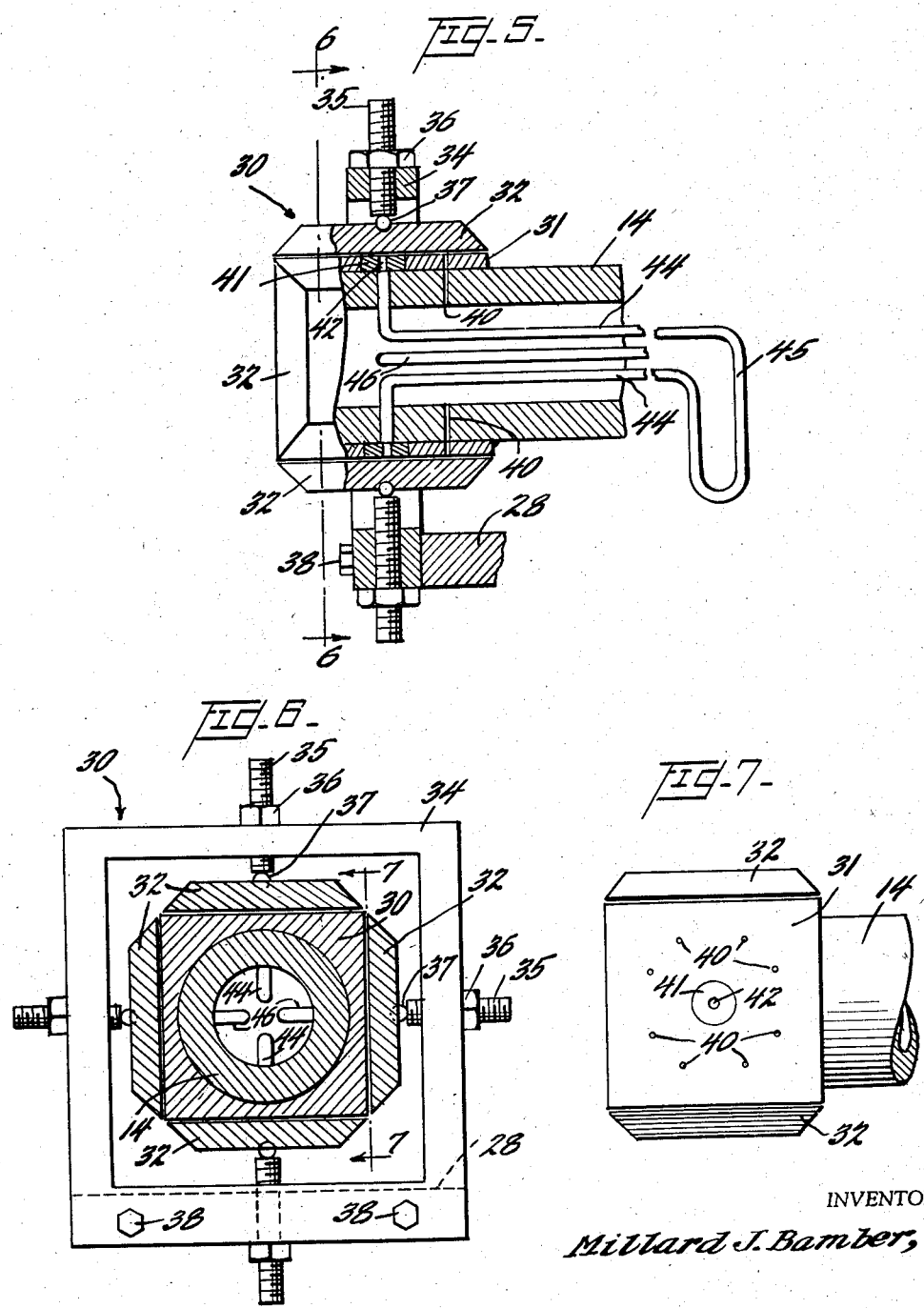

United States Patent Office 2,908,164
Patented Oct. 13, 1959

2,908,164

BEARINGS WITH FORCE INDICATING MEANS

Millard J. Bamber, Washington, D.C., assignor to the United States of America as represented by the Secretary of the Navy Application January 31, 1957, Serial No. 637,600

6 Claims. (Cl. 73—147)

(Granted under Title 35, U.S. Code (1952), sec. 266)

The invention described herein may be manufactured and used by or for the Government of the United States for governmental purposes without the payment of any royalties thereon or therefor.

This invention relates to the testing of aircraft models, and particularly to a system for supporting an aircraft model in a wind tunnel and measuring the magnitude of forces on such model.

More specifically, this invention relates to the utilization of the principal of air-lubricated bearings in a sting-type model-support and force-indicating system.

A number of systems, such as steelyards, balances, springs and the like, have been devised for supporting and measuring forces on aircraft models in wind tunnels. However, each of the known systems has certain inherent disadvantages, such as being inaccurate and/or too complicated and bulky.

A prime requisite of a sting-type model support is that it must be relatively small and simple so as to fit within an aircraft model and still be capable of indicating forces and moments with the required accuracy.

A principle object of the present invention is to provide a system for indicating the forces acting on an aircraft model more accurately than is obtainable with heretofore known practical means.

A further object of this invention is to provide a support and force-indicating system wherein forces on an object can be measured with precision at a location remote from the object.

A further object of this invention is to provide a support and force-indicating system that is relatively simple, compact and accurate.

A more specific object of the present invention is to provide a support for testing model aircraft, which support is devoid of solid friction.

Applicant conceived that because of the frictionless characteristics of air-lubricated bearings, theoretically their only resistance to motion is air viscosity, their use in a model-support and force-indicating system could be both convenient and practical. Subsequent tests proved this thought.

The force-indicating possibilities arise from the fact that, under certain conditions, the pressure differential existing between opposite sides of an air bearing must bear some relation to the weight supported by the bearing, that is, the load. In using such a system in wind tunnels as a model support, especially the sting-mounted type, the support has no solid friction and the pressure differential can be measured with precision outside of the wind tunnel. Also the pressures can be fed into a computor for at least partial reduction of data.

The practicability of using the principle of air-lubricated bearings depends primarily upon the exactness with which the differential pressures taken from the bearing correspond to the load. The theory or principle of operation of air-lubricated bearings is well known in the art and need not be described in detail here.

The invention, together with the above and other objects and advantages, is set forth in more technical detail in the following description and accompanying drawings, wherein:

Fig. 1 is a side elevational view of a sting-type model support incorporating this invention;

Fig. 2 is a longitudinal section taken substantially on line 2—2 of Fig. 1 illustrating a ball-and-socket type of air bearing with a manometer remotely connected thereto;

Fig. 3 is a transverse section taken on line 3—3 of Fig. 2;

Fig. 4 is a transverse section similar to that of Fig. 3, and taken on line 4—4 of Fig. 2;

Fig. 5 is a longitudinal section and partial elevation of the flat-pad type of air bearing, shown at the left end of Fig. 1, and having a manometer connected thereto;

Fig. 6 is a transverse section taken on line 6—6 of Fig. 5;

Fig. 7 is a side elevational view of a part of the air bearing shown in Figs. 5 and 6 and taken substantially on line 7—7 of Fig. 6.

Referring now to Fig. 1 of the drawing wherein a preferred embodiment of the invention comprises a sting support, indicated by reference numeral 10, upon which is mounted an aircraft model 12, diagrammatically illustrated by broken lines, all located within a wind tunnel, not shown.

The sting support includes a hollow steel member 14 rigidly mounted at the right-hand end thereof on a suitable support 16 within the wind tunnel. The tubular member 14 is closed at each end, except that a high-pressure air line 18 opens into the right-hand end thereof. Air line 18 supplies high-pressure air to support 14 from a suitable source, not shown. Tubular member 14 is formed with an integral nipple or branch section 14a in open communication therewith, which branch section is closed at its outer end. Mounted on the support or tubular member 14 are three air-lubricated bearings, 20, 20' and 30. The construction and operation of bearings 20 and 20' are substantially identical, so that a detailed description of one such bearing will suffice.

With reference to Figs. 2, 3 and 4, bearing 20 includes a sleeve or cylindrical member 21 having an interior diameter slightly greater than the exterior diameter of the tube 14 so as to provide a slight clearance therebetween, which clearance is exaggerated in Figs. 2–4. The exterior surface of sleeve 21 is formed with a spherical portion 21a upon which is mounted a collar 22, which collar is made of two identical halves for ease of assembly, and the collar is formed with a concave portion 22a that coincides in contour with the spherical portion 21a of sleeve 21, thereby forming a ball-and-socket joint and a self-aligning bearing. The sleeve 21 and collar 22 are each formed of brass, bronze or other suitable bearing metal. A rectangular steel plate 23 having a circular opening therein is rigidly attached, as by a press-fit, to the collar 22. In practice the sleeve 21, collar 22 and rectangular plate 23 are assembled as a unit and then slipped onto the tubular member 14.

As shown in Figs. 2 and 3, the tubular support 14 is formed with two sets of relatively small radial air ports or pressure orifices 24 for flow of high pressure air from the interior of the support to the space between the support and the bearing sleeve 21 mounted thereon. For purpose of illustration, the diameter of the pressure orifices 24 is exaggerated in Figs. 2 and 3. As shown in Figs. 2 and 4, the tubular support 14 is formed with four equally-spaced, radial bores therein for the reception of the ends of two pairs of air-pressure taps or lead-out tubes 25 and 26. The end of each of air tubes 25 and 26 is expanded or otherwise sealed within its respective opening in support 14, and the entrance or inlet end of each of the air tubes is countersunk, as shown in Fig. 4. Each of the pairs of air tubes is carried through the support 14 to a point without the wind tunnel where they are each connected to suitable difference-in-pressure indicator such for example as a manometer, or other type of pressure indicator or to a pressure recorder. Fig. 2, diagrammatically shows the remote ends of tubes 25 connected to a manometer 27. The remote ends of tubes 26 are connected to a second manometer, not shown.

A rectangular steel plate 28 is fitted in abutting relation with a lower surface of plate 23 and is rigidly attached to such plate by a pair of spaced set screws 29, only one of which screws is shown in Fig. 1. Plate 28 is provided with a circular opening therein for the reception, as by press fit, of the cylindrical collar 22' of air-lubricated bearing 20'. Bearing 20' is fitted onto the tubular nipple 14a of support 14 and, as stated heretofore, is of the same construction as bearing 20.

Referring now to Figs. 5-7, air-lubricated bearing 30, attached to the left end (Fig. 1) of support 14, includes a metal box-like member 31 having a cylinder bore, open at the right-hand end and closed at the left end. The bore of member 31 is of substantially the same diameter as the exterior of tubular support 14, for press-fit attachment to such support. The exterior of member 31 is generally cubical in shape with five flat, closed faces and one open face, which open face is for insertion onto support 14, as just mentioned. Four flat, rectangular pads 32, one for each of the upper, lower and side faces (Fig. 6) of bearing member 31, are held in spaced relation to bearing member 31 by a rectangular steel frame 34. Frame 34 is drilled and tapped for the reception of four adjusting screws 35. Each of the adjusting screws is provided with a lock nut 36 and with a ball bearing 37, which ball bearing is held in place by a pair of dimples, one formed in the end of the adjusting screw and the other in center of the respective pad 32. For purpose of illustration, the air space or clearance between the flat faces of bearing member 31 and the pads 32 is exaggerated in Figs. 5 and 6. A pair of set screws 38, threaded into tapped openings in the left end (Fig. 1) of plate 28, hold frame member 34 rigidly attached to such plate.

As shown in Figs. 5 and 7, a plurality of small air-supply ports or orifices 40 extend radially from the interior of support 14 through each of the top, bottom and two side faces of box-like bearing member 31, and these orifices open into the clearance spaces between the faces of member 31 and the flat pads 32. Fig. 7 shows eight such air ports in one of the side faces of member 31 and a like number of ports is located in each of the other faces. However, as will be described hereinafter, the number and size of the air ports used depends upon the use of the air bearing and the air pressure supplied thereto.

The box-like bearing member 31 may be formed as an integral part of support 14 with four equally-spaced radial bores therein for the reception of two pairs of air pressure taps or lead-out tubes that are the same in construction and perform the same function as tubes 25 and 26 of Figs. 2-4. However, in the specific embodiment of the invention illustrated in Figs. 5-7, the box-like member 31 is formed as a separate piece pneumatically sealed to the left end of support 14. As shown, each of the top, bottom and side faces of member 31 is provided with a centrally located insert 41 having an orifice 42 therein. The top and bottom orifices 42 (Fig. 5) open into a pair of air, lead-out tubes 44, the entrance ends of which air tubes are pneumatically sealed within a pair of diametrically opposite openings in support 14, and the remote ends of which air tubes extend through the support to a convenient location without the wind tunnel where they are connected to a difference-in-pressure indicator such as a manometer 45 (Fig. 5). The two side orifices open into a like pair of air, lead-out tubes 46 (only one of which is shown in Fig. 5), which tubes likewise extend through the support to a point without the wind tunnel where they are connected to a difference-in-pressure indicator.

In practice, the surfaces of the four bearing faces of member 31 and the four individual pads 32 must be carefully finished, and opposing pads, air supply ports, air lead-out ports and the like must be alike or matched if the calibration of the bearing is not to change with air-supply pressure or change in the direction of the load on the bearing.

Each of the bearings 20, 20' and 30 performs the same function and these bearings are in fact interchangeable. In certain installations, the round bearing, as 20 and 20', are more desirable; in other installations the square bearing 30 is more desirable; whereas, in still other installations, a combination of round and square bearings appears to give best results.

With air-lubricated bearings, when a force is applied to the support system, the component perpendicular to a bearing surface increases the gap or clearance on one side and decreases the gap or clearance on the other or opposite side of the bearing. The larger the clearance the smaller the pressure and the smaller the clearance the larger the pressure that can be maintained by high-pressure air flowing through the pressure ports of the bearing. The difference in pressures picked up by the pressure lead-out taps indicate that component of the force.

An air bearing has restraint in only one plane; the plane perpendicular to the axis of the bearing. It is free to turn on and to move along the shaft. Thus if three bearing units like those shown in Fig. 1 are rigidly positioned with respect to each other in a framework on shafts with mutually parallel and perpendicular axis such as shown in Fig. 1, the bearing assemblies will have no more motion with respect to each other than the clearance in the bearings. By locating the pressure taps shown in Figs. 4 and 5 in planes mutually parallel and perpendicular to each other, the forces indicated by the pressure differences can be used to determine the components of the resultant of the forces and moments applied to the system.

It is to be noted, in the illustrated embodiment of the invention, the air-lubricated bearings 20 and 30 are of themselves free to turn on and to move longitudinally of the support 14. However, because of their connection with plate 28, this longitudinal and rotary movement is limited to the amount of clearance (not shown) provided between branch 14a of the support and sleeve 21' of bearing 20'. Likewise, bearing 20' is of itself free to turn on and to move longitudinally relative to branch 14a. But these latter movements are limited by the clearance provided between support 14 and sleeve 21 of bearing 20 and by the like clearance between member 31 and the pads 32 of bearing 30. Thus, because of the interlock between bearings 20, 30 and 20', through frames 23 and 34 and plate 28, each of the bearings, for all practical purposes, is limited to movement in a plane perpendicular to the axis (transversely or radially) of its support, which movement is limited by predetermined clearance.

In practice the maximum load carrying capacity of the system depends principally upon the area of the bearing surfaces and upon the air pressure supplied thereto. With the illustrated embodiment of the invention, air pressures of between 20 and 1000 p.s.i. have been used with no change in operating characteristics except for load carrying capacity. From test results, there is no reason to believe that the characteristics would be changed with higher air pressures. The best all-around results are believed to be obtained with one 0.0135-inch diameter air-supply port per square inch of bearing surface and with bearing clearance in a range of 0.0005 to 0.0010 inch. However, performance-wise, there appears to be little if any relation between air pressure, load, air-supply orifice area and clearance.

In operation, an aircraft model 12 (Fig. 1) which is hollow is slipped over the left end of support 14 and is attached by suitable means, not shown, to plate 28 of the bearing system. Air, under relatively high pressure, is then supplied through conduit 18 to the interior of the tubular support 14, from whence the high pressure air flows through the air-supply ports 24 of bearing 20, 24' (not shown) of bearing 20' and 40 of bearing 30, into the clearance spaces of each of the bearings, whereupon each of the bearings with the model supported thereby is supported by a film of relatively static high pressure air. Assuming that the separate pairs of air lead-out tubes 25 and 26 of bearing 20, 25' and 26' (not shown) of bearing 20' and 44 and 46 of bearing 30 are connected to suitable pressure differential gauges, such as manometers 27 and 45 of Figs. 2 and 5, a reading of the gauges will show the pressure differences and thus the loads on opposite sides of the bearings.

Assuming for descriptive purpose of force direction that Fig. 1 is a side elevational view of the support with the model attached thereto, although this figure might just as well be a top or a bottom plan view of the support, forces and components thereof that operate in opposite directions in three major planes may be read on the pressure differential gauges or recorded on a suitable recorder. That is, the gauges remotely connected to the lead-out tubes of bearing 20 will indicate differences in pressure to forces and their components acting vertically upward and vertically downward in planes parallel to the paper, and horizontal forces inward and outward in planes perpendicular to the paper. The gauges connected to the lead-out tubes of bearing 30 will indicate differences in pressure of forces and their components in directions generally the same as those of bearing 20. The gauges connected to the lead-out tubes of bearing 20' will indicate differences in pressure of horizontal, transverse forces and their components inward and outward in planes perpendicular to the plane of the paper and horizontal, longitudinal forces and their components from the left and the right in planes parallel to the plane of the papers. Thus the resultant of three principal forces and their components may be ascertained, from which the principal moments may be calculated.

Without further description, it is thought that the novel features and advantages of the invention will be readily apparent to those skilled in the art to which the invention appertains, and it will, of course, be understood that changes in form, proportions and minor details of construction may be resorted to without departing from the spirit of the invention and scope of the claims.

What is claimed is:

1. An apparatus for measuring component forces and moments developed by relative motion of a hollow test model in a fluid medium, said apparatus comprising a sting-type tubular support, means for supplying air under relatively high pressure to the interior of the support, bearing means for supporting the test model on the support for limited movement of the model relative to the support, said support and said bearing means fitting within and being enclosed by the hollow test model, said bearing means including an air-lubricated bearing mounted on the exterior of the support in spaced relation thereto to thereby form a clearance space therebetween, said support having a plurality of air-supply ports leading from the interior thereof to diametrically opposite areas of the clearance space, a plurality of pressure tap-off tubes leading from diametrically opposite sides of the clearance space through the tubular support to a point remote from the support, and pressure differential indicating means connected to the remote ends of the tap-off tubes.

2. An apparatus as set forth in claim 1 wherein the air-lubricated bearing includes an interior surface of substantially the same cross-sectional shape as that portion of the exterior surface of the support upon which the bearing is mounted.

3. An apparatus as set forth in claim 1 wherein the tubular support includes a cylindrical exterior surface, wherein the air-lubricated bearing includes a sleeve having a cylindrical interior surface of substantially the same contour as the cylindrical exterior surface of the support, and wherein the clearance space is circular in cross section.

4. An apparatus as set forth in claim 3 wherein the plurality of air-supply ports radiate in substantially uniform spaced relation from the interior of the tubular support to the circular clearance space throughout the circumference thereof, and wherein the plurality of pressure tap-off tubes includes four tubes leading from uniformly spaced points of the circular clearance space with diametrically opposite tubes of each pair of tubes connected to one of the pressure differential indicating means.

5. An apparatus as set forth in claim 1 wherein the tubular support includes four flat faces uniformly spaced around a circumference thereof, wherein the air-lubricated bearing includes four flat pads with one of such pads supported in spaced relation to each of the four flat faces of the tubular support, wherein the plurality of air supply ports is equally divided between the four flat faces of the tubular support, and wherein one of the plurality of pressure tap-off tubes leads centrally from each of the four flat pads.

6. An apparatus as set forth in claim 1 wherein the bearing means includes three air-lubricated bearings mounted on exterior portions of the support each in spaced relation thereto with two of the bearings mounted on a common axis parallel to the longitudinal axis of the tubular support and with the third of the bearings mounted on an axis perpendicular to the said common axis, and means connecting said three bearings to each other for limited unitary movement relative to the support.

References Cited in the file of this patent

UNITED STATES PATENTS

| 2,485,977 | Mains | Oct. 25, 1949 |
| 2,707,392 | Metrailer | May 3, 1955 |

FOREIGN PATENTS

| 717,708 | Germany | Feb. 20, 1942 |